(12) United States Patent
Enokido

(10) Patent No.: US 9,454,012 B2
(45) Date of Patent: Sep. 27, 2016

(54) WEARABLE DISPLAY, IMAGE DISPLAY UNIT, AND HOLDER

(71) Applicant: Sony Corporation, Tokyo (JP)

(72) Inventor: Toshio Enokido, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/589,246

(22) Filed: Jan. 5, 2015

(65) Prior Publication Data

US 2015/0212328 A1     Jul. 30, 2015

(30) Foreign Application Priority Data

Jan. 30, 2014    (JP) .................................. 2014-015728

(51) Int. Cl.

| | | |
|---|---|---|
| G02B 27/14 | (2006.01) | |
| G09G 5/00 | (2006.01) | |
| G02B 27/01 | (2006.01) | |
| G02B 5/02 | (2006.01) | |

(52) U.S. Cl.
CPC ............. *G02B 27/0176* (2013.01); *G02B 5/02* (2013.01); *G02B 27/0101* (2013.01); *G02B 27/017* (2013.01); *G02B 27/0172* (2013.01); *G02B 2027/0178* (2013.01)

(58) Field of Classification Search
CPC ............ G02B 27/017; G02B 27/0172; G02B 27/0101; G02B 2027/0178
USPC .......................................... 359/630; 345/7–9
See application file for complete search history.

(56) References Cited

U.S. PATENT DOCUMENTS

2010/0027289 A1* 2/2010 Aiki ..................... G02B 6/0011
362/558
2014/0139927 A1* 5/2014 Hiraide .............. G02B 27/0172
359/630

FOREIGN PATENT DOCUMENTS

JP      2006-350129 A      12/2006

* cited by examiner

*Primary Examiner* — William Choi
(74) *Attorney, Agent, or Firm* — Wolf, Greenfield & Sacks, P.C.

(57) ABSTRACT

A wearable display includes: a lighting element; an optical modulation element; a light guiding element configured to guide light from the lighting element to the optical modulation element; a holder configured to integrally hold the lighting element, the optical modulation element, and the light guiding element; and a virtual-image optical assembly that is connected to the holder and configured to generate a virtual image of image light from the optical modulation element.

12 Claims, 9 Drawing Sheets

WEARABLE DISPLAY, IMAGE DISPLAY UNIT, AND HOLDER

CROSS REFERENCE TO RELATED APPLICATIONS

This application claims the benefit of Japanese Priority Patent Application JP 2014-015728 filed Jan. 30, 2014, the entire contents of which are incorporated herein by reference.

BACKGROUND

The present technology relates to a technology for a wearable display such as a head-mounted display.

SUMMARY

There is known a head-mounted display (HMD) that is mounted on a user's head and capable of presenting an image to the user through a display or the like in front of the eyes.

For example, Japanese Patent Application Laid-open No. 2006-350129 discloses a virtual image display apparatus used for a head-mounted display or the like. The virtual image display apparatus includes a light guiding plate upon which display light emitted from an image display element is incident. The display light is repeatedly totally reflected in the light guiding plate and enters a viewer's pupil.

Various techniques for a wearable display such as a head-mounted display have been proposed. However, in these techniques, a large number of components are used for an image display unit that displays an image, and hence it is not easy to assemble the components while ensuring optical precision.

It is thus desirable to provide an image display unit that can be easily assembled, a wearable display including the same, and a holder used therefor.

According to an embodiment of the present technology, there is provided a wearable display including a lighting element, an optical modulation element, a light guiding element, a holder, and a virtual-image optical assembly.

The optical modulation element is configured to generate an image that is to be output by the wearable display.

The light guiding element is configured to guide light from the lighting element to the optical modulation element.

The holder is configured to integrally hold the lighting element, the optical modulation element, and the light guiding element.

The virtual-image optical assembly is connected to the holder and configured to generate a virtual image of image light from the optical modulation element.

The wearable display includes the holder that integrally holds components, and hence a worker who performs assembling only needs to connect the holder to the virtual-image optical assembly. Thus, the worker can easily perform assembling while ensuring the optical precision.

The optical modulation element may be a light transmissive element.

With this, in comparison with a reflective optical modulation element, it is possible to downsize an image display assembly (component formed of at least lighting element, optical modulation element, light guiding element, and holder).

The holder may includes a body including a first end, a second end, and a middle portion. The first end is configured to hold the lighting element. The second end is provided to be opposed to the first end and configured to hold the optical modulation element. The middle portion is provided between the first end and the second end and configured to hold the light guiding element.

With this, the lighting element, the light guiding element, and the optical modulation element are arranged in a line. Thus, it contributes to downsizing of the image display assembly.

The second end may include a first end surface to which the optical modulation element is connected.

The optical modulation element is connected to the end surface of the second end, and hence the size of the holder can be reduced as much as possible.

The first end may also include an end surface to which the lighting element is connected.

The wearable display may further include a diffusion element that is disposed on an emitting end surface of the light guiding element. The second end may include a second end surface to which the diffusion element is connected, the second end surface being provided to be closer to the light guiding element than the first end surface.

With this, it is possible to facilitate assembling and positioning of the diffusion element and the optical modulation element to the holder.

The holder may further include a leg extending from the second end to hold the optical modulation element. The virtual-image optical assembly may be connected to the leg.

With this, it is possible to facilitate and ensure assembling of the optical modulation element to the holder and optical positioning of the optical modulation element and other elements.

The wearable display may further include a sheet metal configured to connect the holder and the virtual-image optical assembly to each other.

With this, the sheet metal is employed as a mechanism for connecting the both, and hence the shock resistance of the wearable display is increased. Further, it is possible to downsize the holder and the virtual-image optical assembly.

The sheet metal may include a main body, and a plurality of projecting pieces provided projecting from the main body to the holder.

With this, it is possible to ensure a clearance between the optical modulation element and the virtual-image optical assembly corresponding to an amount of projection of the projecting pieces. That is, it is possible to achieve downsizing by the sheet metal while keeping the optical position precision of the components.

The wearable display may further include a frame configured to support a light guiding plate of the virtual-image optical assembly. The virtual-image optical assembly may include a collimating optical element configured to receive image light incident from the optical modulation element and emit the image light to the light guiding plate and the collimating optical element may be connected to the frame via the sheet metal.

The sheet metal connects the holder and the collimating optical element to each other and connects the collimating optical element and the frame to each other. With this, it is possible to downsize the wearable display and it contributes to an increase of the shock resistance of the collimating optical element.

The optical modulation element may be a light reflective element.

According to an embodiment of the present technology, there is provided an image display unit including a lighting element, an optical modulation element, a light guiding element, and a holder.

In particular, a holder is configured to be connectable to a virtual-image optical assembly configured to generate a virtual image of image light from the optical modulation element, the holder being configured to integrally hold the lighting element, the optical modulation element, and the light guiding element, the virtual-image optical assembly being used for a wearable display.

According to an embodiment of the present technology, there is provided a holder including a first end, a second end, a housing portion, and a connection portion.

The first end is configured to hold a lighting element.

The second end is provided at a position different from a position of the first end and configured to hold an optical modulation element.

The housing portion is provided between the first end and the second end and configured to house a light guiding element.

The connection portion is configured to be connectable to a virtual-image optical assembly configured to generate a virtual image of image light from the optical modulation element, the connection portion extending from the second end, the virtual-image optical assembly being used for a wearable display.

As described above, according to embodiments of the present technology, it is possible to easily assemble a wearable display.

It should be noted that the effects described here are not necessarily limited and any effect described in the present disclosure may be provided.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, embodiments of the present technology will be described with reference to the drawings.

[First Embodiment]

(Entire Configuration of Wearable Display)

Figure 1:
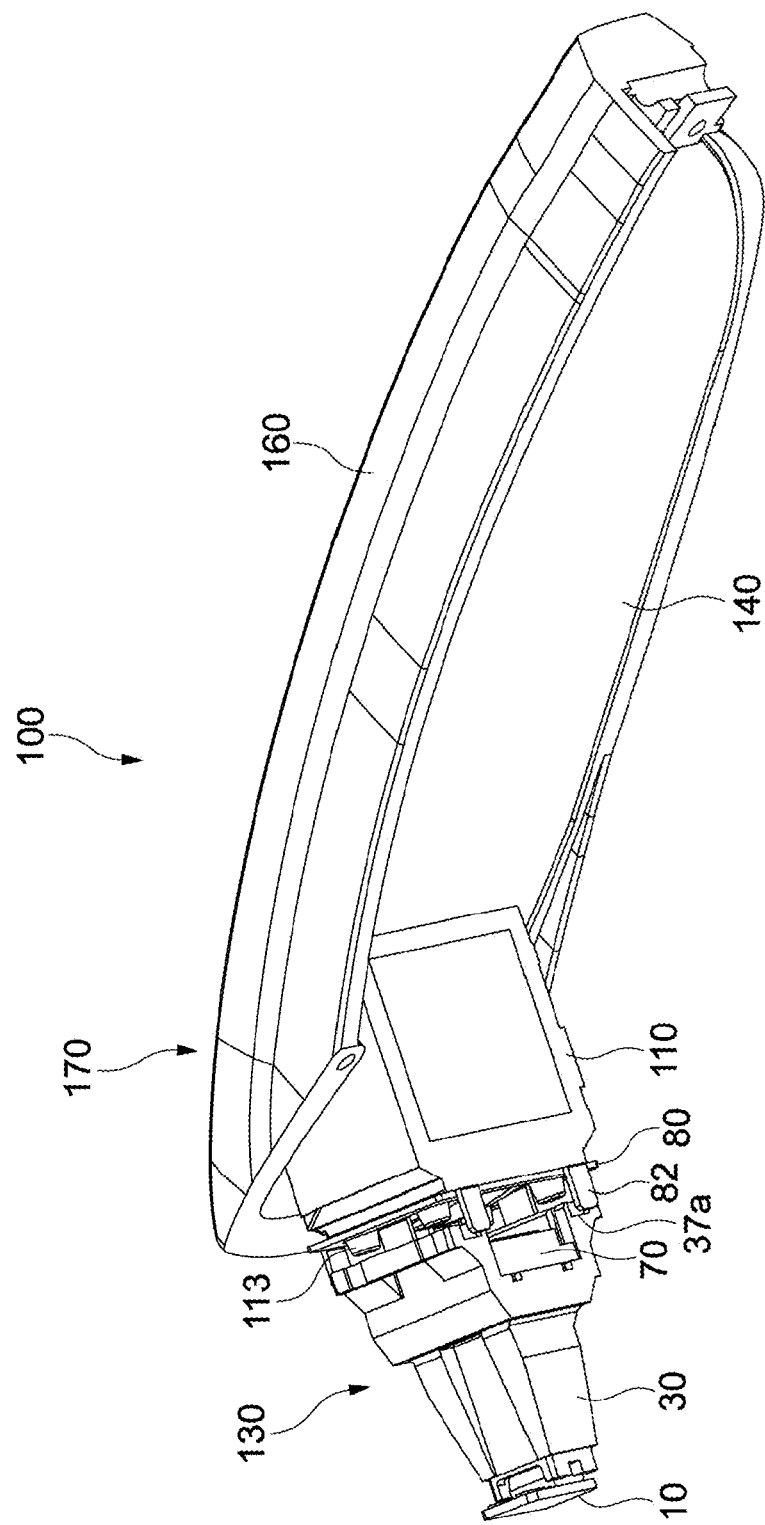
FIG. 1 is a perspective view showing a part of a wearable display according to a first embodiment of the present technology.
Figure 2:
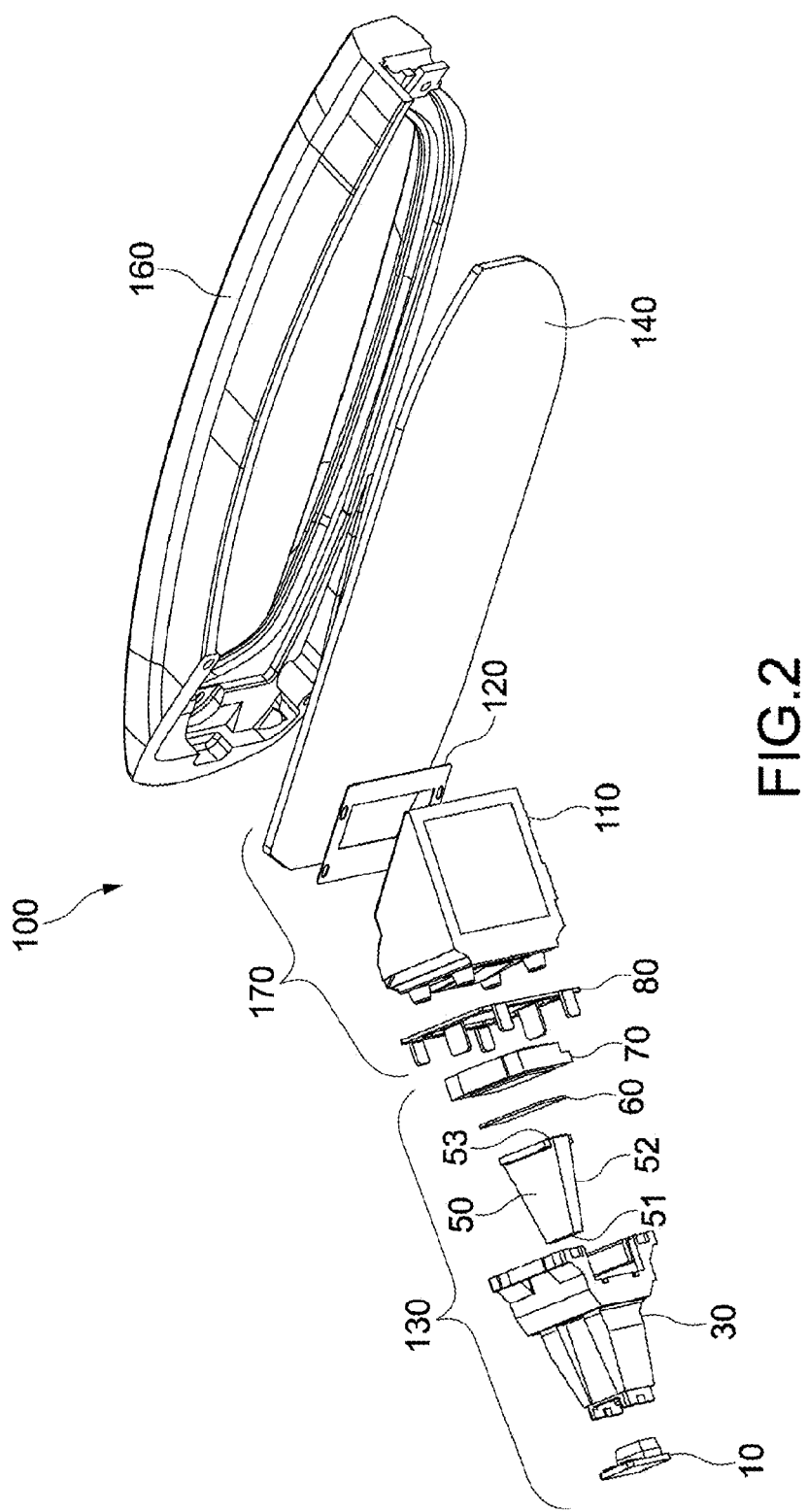
FIG. 2 is an exploded perspective view of the wearable display shown in FIG. 1.

FIG. 1 is a perspective view showing a part of a wearable display according to a first embodiment of the present technology. FIG. 2 is an exploded perspective view of a wearable display 100 shown in FIG. 1.

The wearable display 100 is an eyeglass-type display mountable on a head. Main parts thereof are shown in the figure. The wearable display 100 includes an image display assembly (image display unit) 130, a virtual-image optical assembly 170, and a frame 160 that holds a light guiding plate 140 provided in the virtual-image optical assembly 170.

The frame 160 is configured to surround, for example, 70 percent or more of the length of the circumstance of the light guiding plate 140 that will be described later. The frame 160 is favorably configured to surround the entire circumstance of the light guiding plate 140. With this, it is possible to prevent stress concentration to the light guiding plate 140 and damage of the wearable display 100. Thus, shock resistance can be ensured. Therefore, for example, glass or a thin material can be used for the light guiding plate 140 as will be described later. In other words, it is unnecessary to use expensive reinforced glass or a thick resin material. Thus, the cost can be reduced.

The frame 160 is made of resin or metal. As the metal, the frame 160 is typically made of magnesium alloy. With this, the weight of the wearable display 100 can be reduced.

(Configuration of Image Display Assembly)

As shown in FIG. 2, the image display assembly 130 includes a lighting element 10, a holder 30, a light guiding element 50, a diffusion element 60, and an optical modulation element 70.

Figure 8:
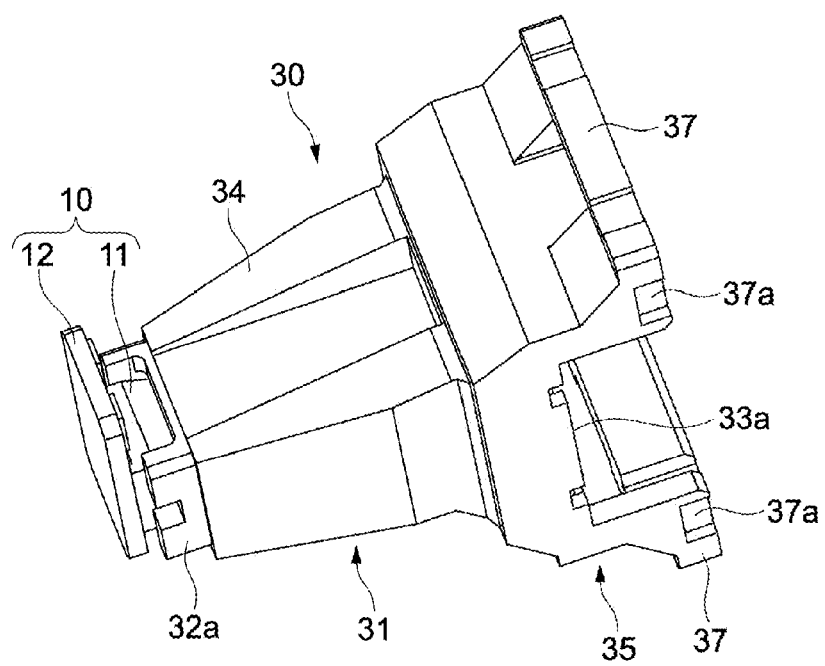
FIG. 8 is a perspective view showing a holder as viewed from an angle different from that of FIG. 7, in which the illustration of an optical modulation element is omitted.

The lighting element 10 includes a light source 11 and a mounting substrate 12 (see FIG. 8). The light source 11 is formed of, for example, a light emitting diode (LED). Alternatively, a light such as electro-luminescence (EL) may be used.

The light guiding element 50 is an element that efficiently guides light emitted from the lighting element 10 to the optical modulation element 70 via the diffusion element 60. For example, the light guiding element 50 includes an incident end surface 51, an emitting end surface 53, and a light guiding portion 52 therebetween. The emitting end surface 53 has a larger area than that of the incident end surface 51.

The light guiding portion 52 is configured to gradually increase in width from the incident end surface 51 to the emitting end surface 53. The incident end surface 51 and the emitting end surface 53 are almost parallel. The light guiding portion 52 has a straight shape extending from the incident end surface 51 to the emitting end surface 53. Due to the straight light guiding element 50, it is possible to save the space of the light guiding element 50 in the image display assembly 130 and downsize the image display assembly 130.

The diffusion element 60 is a plate-like element that diffuses light emitted from the light guiding element 50 for suppressing the uneven illuminance.

Transmissive material such as transparent resin, glass, ceramics is used as the material of the light guiding element 50 and the diffusion element 60. For example, polycarbonate or polyethylene terephthalate (PET) is used as the transparent resin.

For example, a light transmissive liquid-crystal display element is used as the optical modulation element 70.

The holder 30 integrally holds the lighting element 10, the light guiding element 50, the diffusion element 60, and the optical modulation element 70. Hereinafter, the configuration of the holder 30 will be described and how the holder 30 holds the components will be described in detail.

(Configuration of Holder and Holding of Components by Holder)

Figure 3:
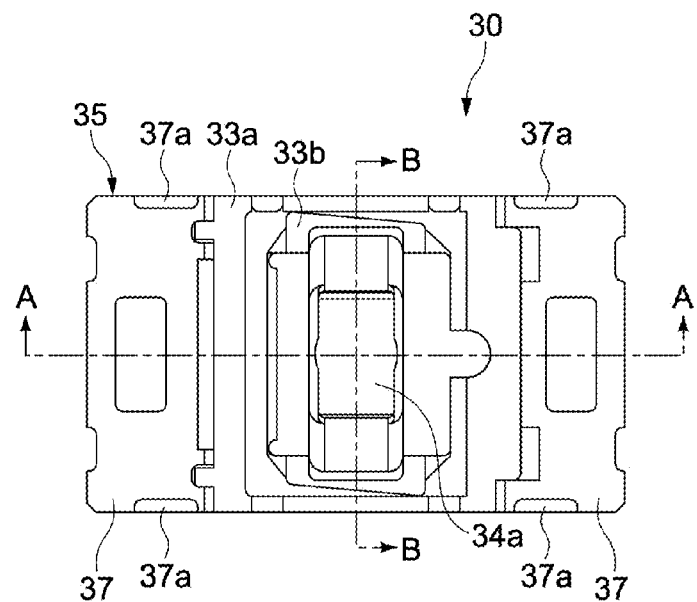
FIG. 3 is a plane view showing a holder.
Figure 4:
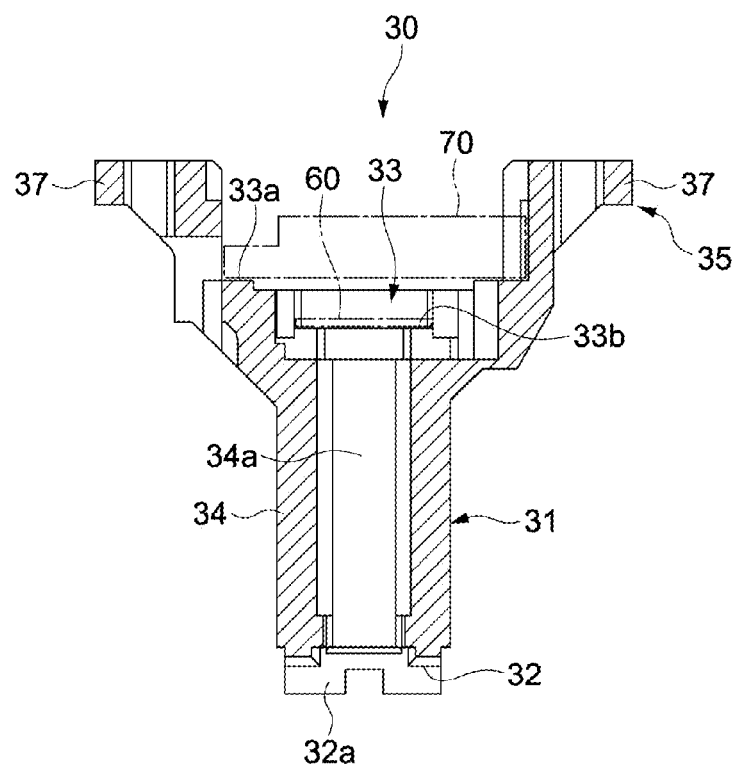
FIG. 4 is a cross-sectional view taken along the A-A line of FIG. 3.
Figure 5:
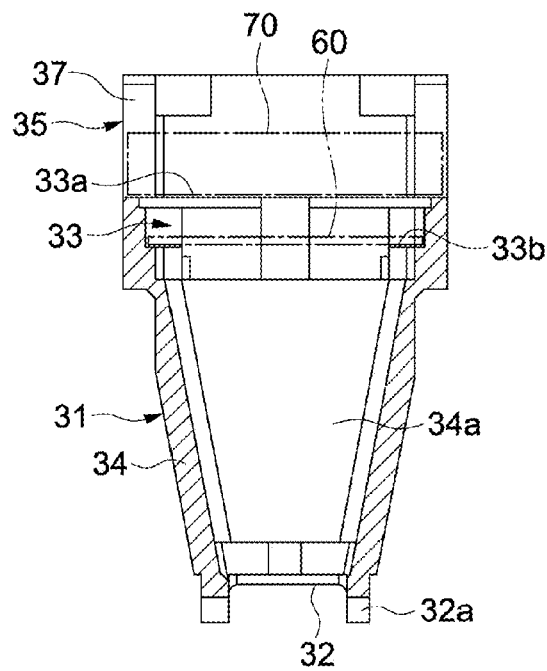
FIG. 5 is a cross-sectional view taken along the B-B line of FIG. 3.
Figure 6:
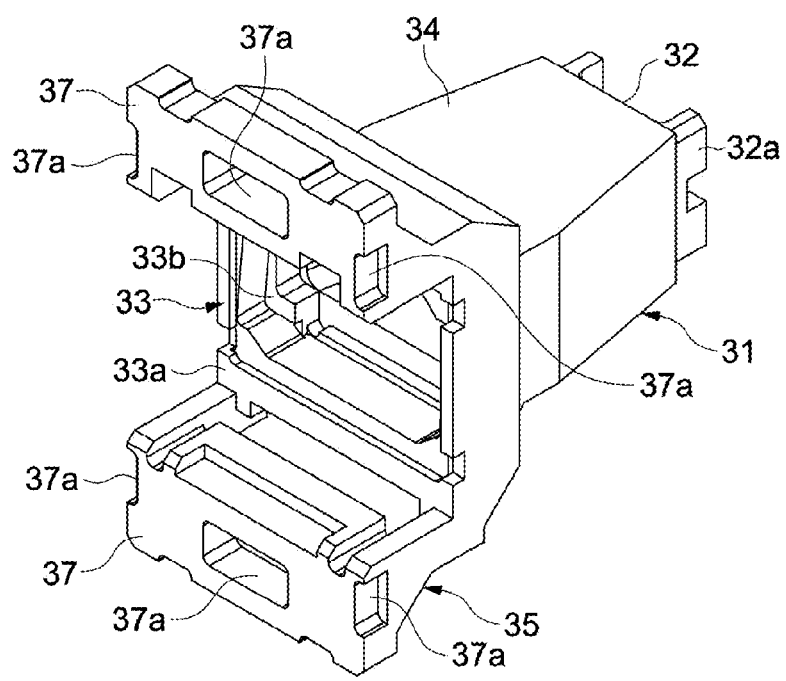
FIG. 6 is a perspective view of a holder shown in FIG. 3.
Figure 7:
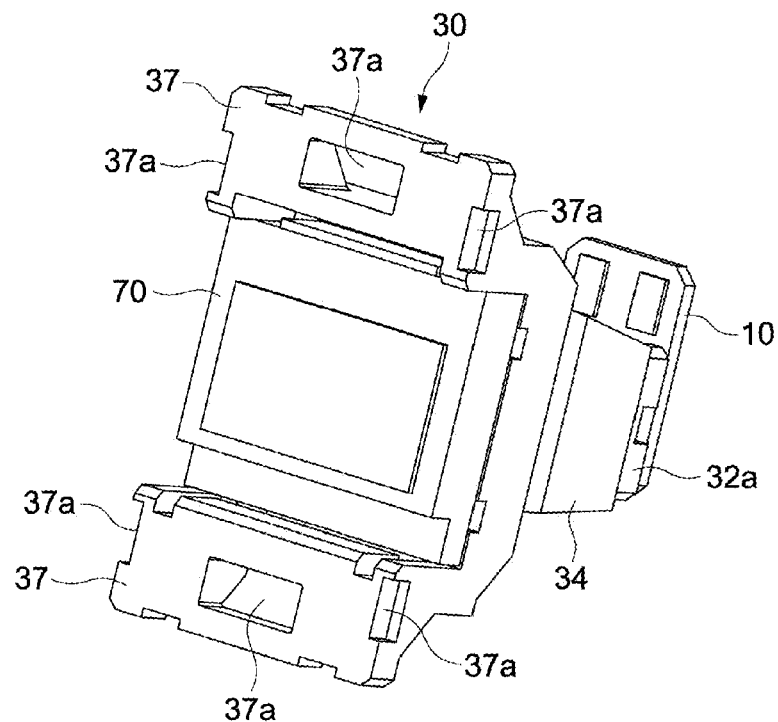
FIG. 7 is a perspective view of the holder that holds elements.

FIG. 3 is a plane view showing the holder 30. FIG. 4 is a cross-sectional view taken along the A-A line of FIG. 3. FIG. 5 is a cross-sectional view taken along the B-B line of FIG. 3. FIG. 6 is a perspective view showing the holder 30. FIG. 7 is a perspective view of the holder 30 that holds the optical elements. FIG. 8 is a perspective view showing the holder 30 of FIG. 7 from a different angle (optical modulation element 70 is omitted).

For example, a synthetic resin such as polyphenylene sulfide (PPS), polypropylene (PP), and polyetheretherketone (PEEK) is used for the material of the holder 30. Of course, another resin may be used.

The holder 30 includes a body 31 and a leg 35 serving as a connection portion. As shown in FIGS. 7 and 8, the body 31 includes a first end 32 at which the lighting element 10 is held, a second end 33 provided to be opposed to the first end 32, at which the optical modulation element 70 is held, and a middle portion (housing portion) 34 provided between the first end 32 and the second end 33. The middle portion 34 houses and holds the light guiding element 50 in an inner space 34a. The leg 35 is formed of two leg pieces 37 and 37 provided extending from the second end 33.

As described above, the light guiding element 50 is straight. The lighting element 10, the light guiding element 50, the diffusion element 60, and the optical modulation element 70 are arranged in a line in the body 31. Thus, it contributes to downsizing of the image display assembly 130.

The first end 32 includes extended pieces 32a extending in a longitudinal direction of the holder 30. The lighting element 10 is held such that the light source 11 is positioned between the extended pieces 32a. The outer shape of the middle portion 34 of the body 31 is formed to gradually increase in width from a light incident side (side of lighting element 10) to a light emitting side (side of optical modulation element 70), conforming to the outer shape of the light guiding element 50. Of course, the width of the body 31 may be constant from the light incident side to the light emitting side, corresponding to the width of the light emitting side (larger width) of the middle portion 34. However, if the middle portion 34 is configured to conform to the outer shape of the light guiding element 50 as described above, it is possible to save the space of the holder 30 in the image display assembly 130 and downsize the image display assembly 130.

Further, the lighting element 10 and the optical modulation element 70 are attached to both ends of the body 31 of the holder 30, and hence it is possible to downsize the holder 30 as much as possible, which contributes to downsizing of the image display assembly 130. Further, the holder 30 holds the lighting element 10 and the optical modulation element 70, and hence a worker can easily assemble the elements to the holder 30 while ensuring an optical distance among the elements with high precision.

Further, the optical modulation element 70 is connected to the second end 33, and hence it is possible to reduce the size of the holder 30 as much as possible.

As shown in FIGS. 4 and 5, the second end 33 includes a first end surface 33a on which the optical modulation element 70 is disposed to be connected thereto and a second end surface 33b on which the diffusion element 60 is disposed to be connected thereto. The second end surface 33b is provided to be closer to the light guiding element 50 than the first end surface 33a. Thus, the second end 33 is formed like stairs with the first end surface 33a and the second end surface 33b, that is, two different surfaces, and hence it is possible to facilitate assembling and positioning of the diffusion element 60 and the optical modulation element 70 to the holder 30.

As shown in FIG. 7, the optical modulation element 70 is held to be sandwiched between the two leg pieces 37 and 37 of the leg 35. With this, it is possible to facilitate and ensure assembling of the optical modulation element 70 to the holder 30 and optical positioning of the optical modulation element 70 and other elements.

An adhesive such as a photo-curing resin is typically used for fixing the optical elements to the holder 30. Another adhesive may be used or the optical elements may be fixed by screwing or the like.

(Configuration of Virtual-Image Optical Assembly)

Figure 9:
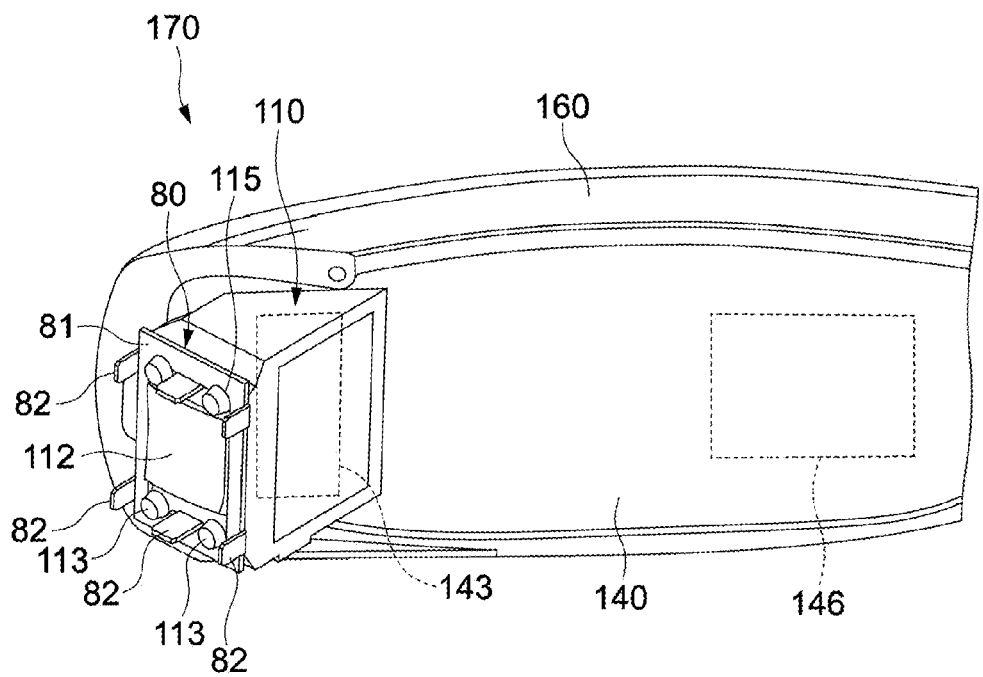
FIG. 9 is a perspective view showing a virtual-image optical assembly.
Figure 10:
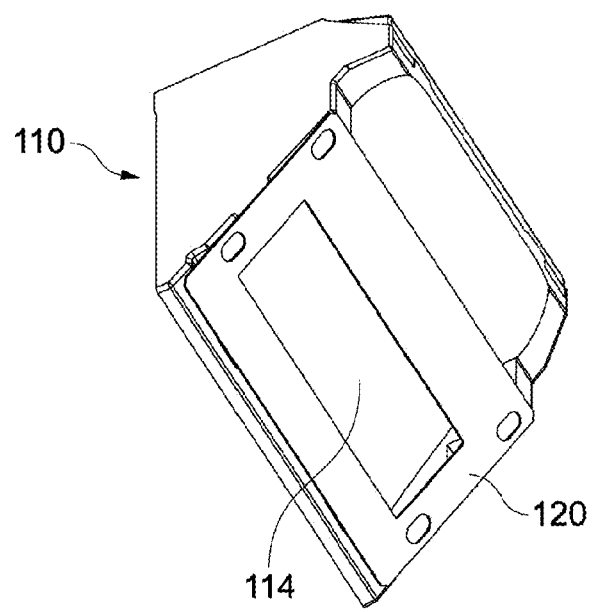
FIG. 10 is a view of a collimating optical element as viewed from an aperture.

FIG. 9 is a perspective view showing the virtual-image optical assembly 170. The virtual-image optical assembly 170 includes a collimating optical element 110, an aperture 120 (see FIG. 2), and the light guiding plate 140. FIG. 10 is a perspective view of the collimating optical element 110 as viewed from an emitting side surface 114 thereof.

The collimating optical element 110 includes an incident side surface 112 upon which image light emitted from the optical modulation element 70 of the image display assembly 130 is incident. The image light incident from the incident side surface 112 forms a plurality of parallel luminous fluxes having different angles of view inside the collimating optical element 110. Further, the collimating optical element 110 includes the emitting side surface 114 that emits the parallel fluxes toward the light guiding plate 140.

The collimating optical element 110 according to this embodiment has a special shape, for example, a triangular prism or a modified quadrangular prism. However, the collimating optical element is not limited to the special shape and may be an element that is formed of a combination of lenses and unitized.

The light guiding plate 140 is attached to the frame 160 as described above. As shown in FIG. 10, the aperture 120 is connected to the emitting side surface 114 of the collimating optical element 110. The incident side surface 112 of the collimating optical element 110 is connected to the image display assembly 130 via a sheet metal 80. The emitting side surface 114 is connected to the light guiding plate 140 via the aperture 120 (see FIGS. 2 and 10).

As shown in FIG. 9, the light guiding plate 140 includes an incident port 143 at one end thereof and an emitting port 146 at the other end thereof. Image light emitted from the collimating optical element 110 is incident upon the incident port 143. The emitting port 146 emits image light incident from the incident port 143 toward a human pupil. If necessary, a reflection mirror or a reflective volume hologram grating (not shown) is provided in a surface of the light guiding plate 140 on an opposite side of the incident port 143 and the surface of the light guiding plate 140 on an opposite side of the emitting port 146.

In the light guiding plate 140, image light incident from the incident port 143 is reflected or diffracted by the reflection mirror, the reflective volume hologram grating, or the like and travels to the emitting port 146 while being repeatedly totally reflected. Near the emitting port 146, the image light is, as in the incident port 143, reflected or diffracted by the reflection mirror or the reflective volume hologram grating (not shown) and emitted from the emitting port 146 to the pupil.

An adhesive such as a photo-curing resin is typically used for fixing the collimating optical element 110 to the sheet metal 80 and fixing the collimating optical element 110 to the light guiding plate 140. However, another adhesive may be used or the collimating optical element 110 and the collimating optical element 110 may be connected to the sheet metal 80 and the light guiding plate 140 by screwing or the like. For fixing the collimating optical element 110 to the aperture 120, the same is applied.

(Connection of Image Display Assembly and Virtual-Image Optical Assembly)

As shown in FIG. 9, the wearable display 100 further includes the sheet metal 80 that connects and fixes the image display assembly 130 and the virtual-image optical assembly 170 to each other. Stainless steel, iron, copper, or the like is used for the material of the sheet metal 80.

The sheet metal 80 includes a frame 81 serving as a main body and a plurality of projecting pieces 82 perpendicularly projecting from the frame 81. The incident side surface 112 of the collimating optical element 110 is connected to the frame 81. Then, the projecting pieces 82 are connected to the leg 35 of the holder 30.

In an inner periphery of the frame 81, there are provided cutouts 115 engaged to a plurality of projections 113 provided in the incident side surface 112 of the collimating optical element 110. Due to engagement of the plurality of projections 113 and the cutouts 115, the collimating optical element 110 and the sheet metal 80 are positioned to each other.

As shown in FIGS. 6 to 8, the leg pieces 37 of the leg 35 of the holder 30 include a plurality of recesses 37a at ends thereof. As shown in FIG. 1, the projecting pieces 82 are connected to the recesses 37a. For connecting and fixing the projecting pieces 82 to the recesses 37a, an adhesive such as a photo-curing resin is used. However, another adhesive may be used or the projecting pieces 82 and the recesses 37a may be connected by screwing or the like. Note that, as shown in FIG. 1, a space is formed between the projecting piece 82 and the recess 37a and the adhesive is present in this space.

A clearance between the optical modulation element 70 and the virtual-image optical assembly 170 can be ensured corresponding to an amount of projection of the projecting pieces 82. That is, it is possible to achieve downsizing by the sheet metal 80 while keeping the optical position precision of the optical elements.

Transmissive material such as transparent resin, glass, ceramics is used as the material of the collimating optical element 110 and the light guiding plate 140. For example, polycarbonate or polyethylene terephthalate (PET) is used as the transparent resin.

(Conclusion)

As described above, the wearable display 100 according to this embodiment includes the holder 30 that integrally holds the components, and hence the worker who performs assembling only needs to connect the holder 30 to the virtual-image optical assembly 170. Thus, it is possible to easily perform assembling while ensuring the optical precision. With this, the cost can also be reduced.

The transmissive optical modulation element 70 is used, and hence the image display assembly 130 can be downsized in comparison with the case where a reflective optical modulation element is used.

The sheet metal 80 is used for connecting the image display assembly 130 and the virtual-image optical assembly 170, and hence the shock resistance of the wearable display 100 is increased. In addition, it is possible to downsize the holder 30 and the virtual-image optical assembly 170 (in other words, to save the space of the wearable display 100 in which the holder 30 and the virtual-image optical assembly 170 are provided).

The leg 35 of the holder 30 according to this embodiment is not limited to have a function of clamping the optical modulation element 70. The leg 35 has a shape capable of clamping a jig for assembling and adjustment, and hence assembling and adjustment are facilitated.

[Second Embodiment]

Figure 11:
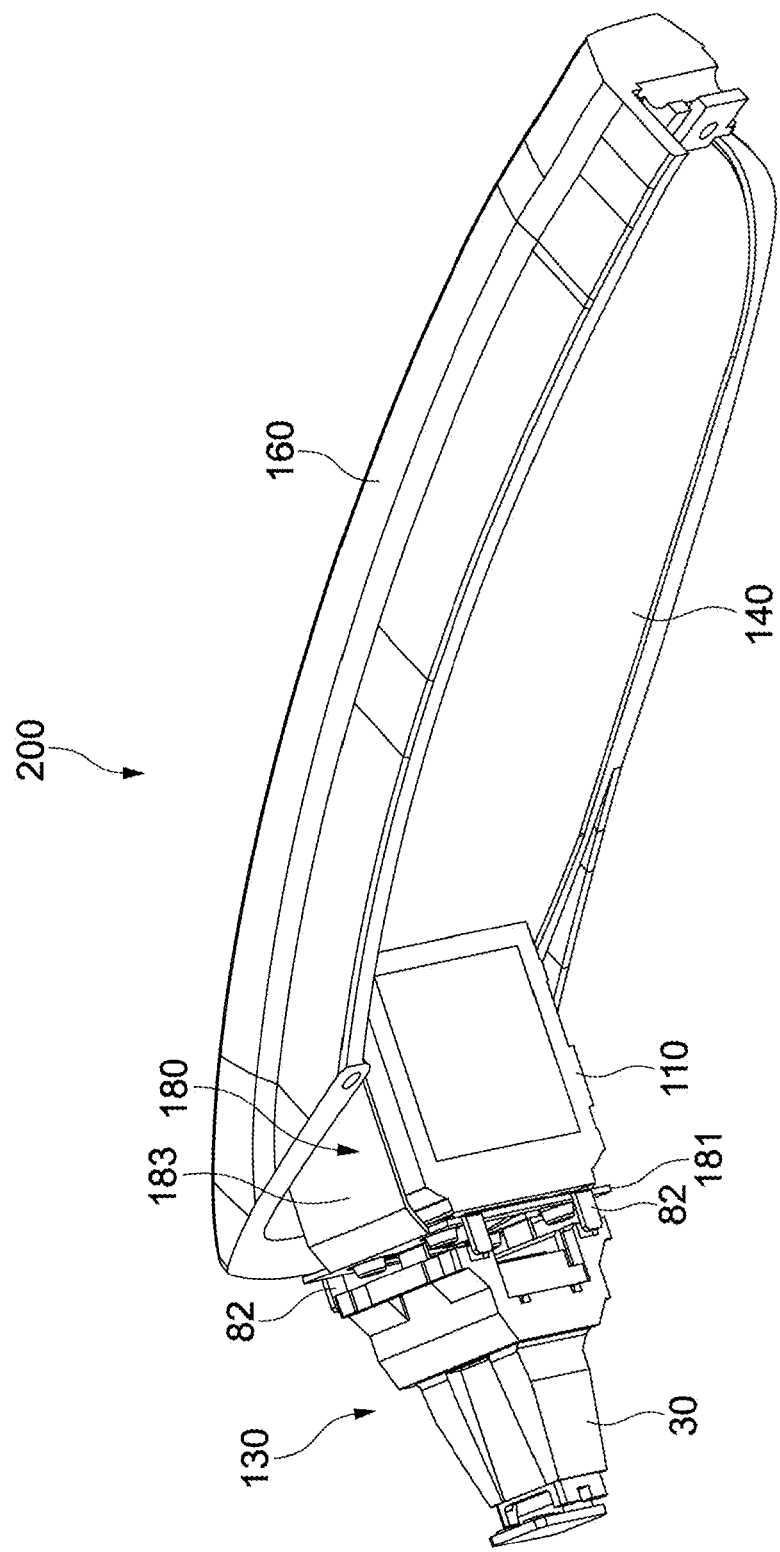
FIG. 11 is a perspective view showing main parts of a wearable display according to a second embodiment of the present technology.

FIG. 11 is a perspective view showing main parts of a wearable display according to a second embodiment of the present technology. Hereinafter, descriptions of the same members, functions, and the like as those of the wearable display 100 according to the above-mentioned embodiment will be simplified or omitted and different points will be mainly described.

Figure 12:
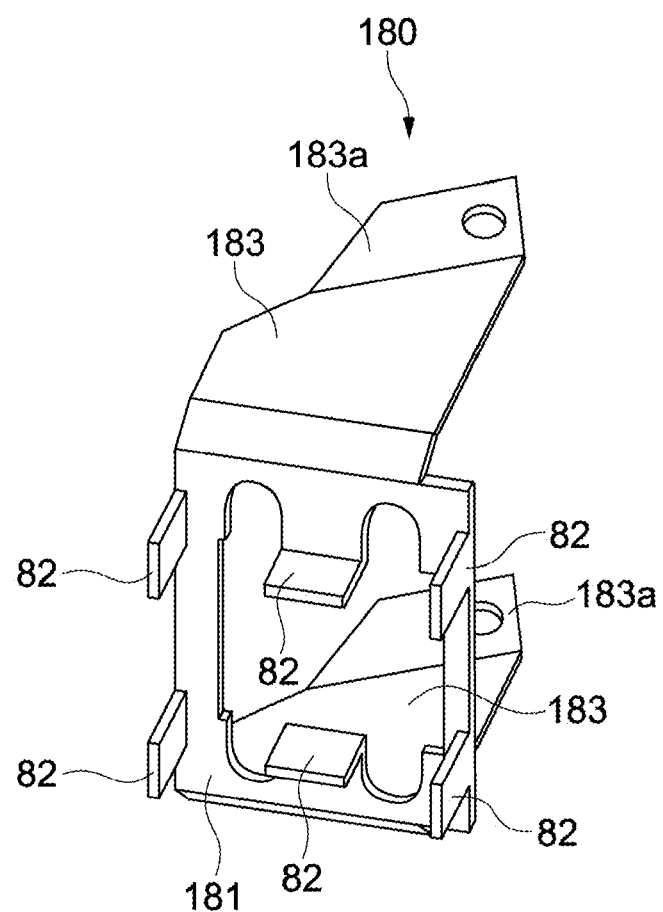
FIG. 12 is a perspective view showing a sheet metal according to a second embodiment.

A sheet metal 180 of a wearable display 200 is connected to the holder 30 and the frame 160. FIG. 12 is a perspective view showing the sheet metal 180. The sheet metal 180 is formed by integral molding, and includes a bottom frame 181 and both side portions 183 and 183. That is, the sheet metal 180 has an outer shape in almost a U-shape or an inverse C-shape as viewed in one direction.

The bottom frame 181 has the same functions as those of the frame 81 of the sheet metal 180 according to the first embodiment. The both side portions 183 are attached to the side surfaces of the collimating optical element 110 as shown in FIG. 11. The sheet metal 180 is fixed to the frame 160 with screws, for example, at the ends 183a of the both side portions 183 while holding the collimating optical element 110.

As described above, the holder 30 and the collimating optical element 110 are connected to each other via the sheet metal 180 and the collimating optical element 110 and the frame 160 are connected to each other via the sheet metal 180. With this, it is possible to downsize the wearable display 200 as in the above-mentioned embodiment. In addition, it is possible to increase the shock resistance of the collimating optical element 110.

[Third Embodiment]

Figure 13:
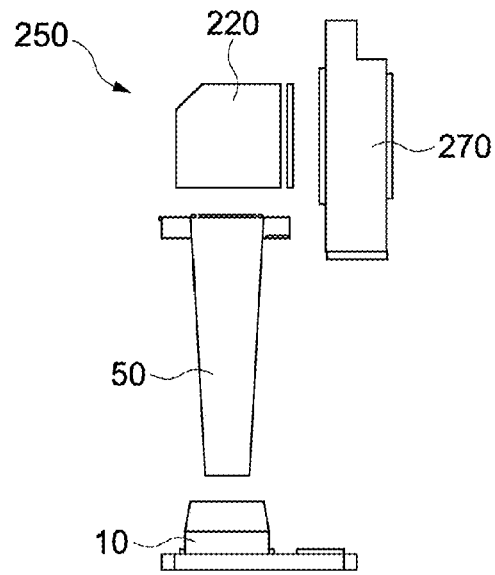
FIG. 13 is a view showing an image display assembly of a wearable display according to a third embodiment of the present technology.
Figure 14:
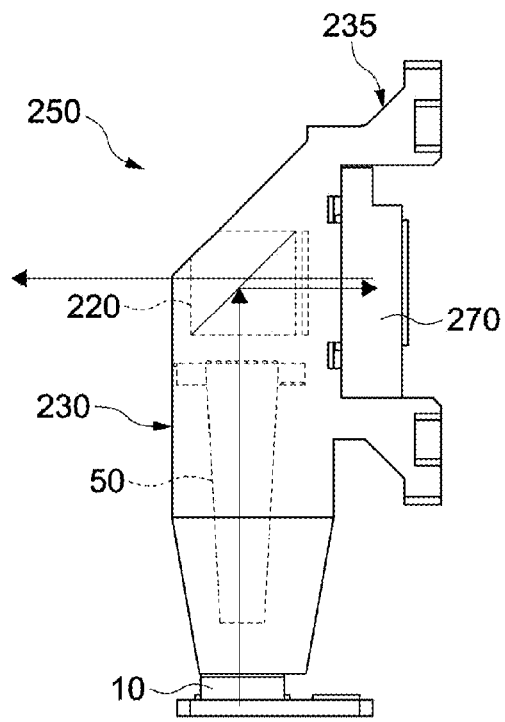
FIG. 14 is a perspective view showing a holder that integrally holds optical elements constituting an image display assembly shown in FIG. 13.

FIG. 13 is a view showing optical elements of an image display assembly of a wearable display according to a third embodiment of the present technology. FIG. 14 is a perspective view showing the optical elements shown in FIG. 13 and a holder 230 that integrally holds the optical elements.

As shown in FIG. 14, an image display assembly 250 includes a lighting element 10, a light guiding element 50, a prism element 220, an optical modulation element 270, and the holder 230 that integrally holds the lighting element 10, the light guiding element 50, the prism element 220, and the optical modulation element 270. The optical modulation element 270 is a reflective liquid-crystal display element, for example.

The prism element 220 includes, for example, a polarized beam splitter. That is, the prism element 220 reflects light from the light guiding element 50 to the optical modulation element 270, and receives image light emitted from the optical modulation element 270 and emits the light to another direction due to internal reflection.

The straight light guiding element as shown in FIG. 2 is used as the light guiding element 50.

Thus, the present technology is applicable also to the reflective optical modulation element 270.

[Other Embodiments]

The present technology is not limited to the embodiments described above and various other embodiments can be realized.

In the above-mentioned embodiments, the image display assembly 130 and the virtual-image optical assembly 170 are connected to each other due to the sheet metal 80 or the like. However, the image display assembly 130 and the virtual-image optical assembly 170 may be connected to each other directly with an adhesive without the sheet metal.

As the reflective optical modulation element, the liquid-crystal display element may be replaced by a digital micromirror device (DMD). In this case, the design of the optical elements and the holder can suitably be changed in accordance with the replacement.

At least two of the features in the above-mentioned embodiments may be combined.

The present technology may also take the following configurations.

(1) A wearable display, including:
  a lighting element;
  an optical modulation element;
  a light guiding element configured to guide light from the lighting element to the optical modulation element;
  a holder configured to integrally hold the lighting element, the optical modulation element, and the light guiding element; and
  a virtual-image optical assembly that is connected to the holder and configured to generate a virtual image of image light from the optical modulation element.

(2) The wearable display according to (1), wherein
  the optical modulation element is a light transmissive element.

(3) The wearable display according to (2), wherein
  the holder includes a body including
    a first end configured to hold the lighting element,
    a second end that is provided to be opposed to the first end and configured to hold the optical modulation element, and
    a middle portion that is provided between the first end and the second end and configured to hold the light guiding element.

(4) The wearable display according to (3), wherein
  the second end includes a first end surface to which the optical modulation element is connected.

(5) The wearable display according to (4), further including
  a diffusion element that is disposed on an emitting end surface of the light guiding element, wherein
  the second end includes a second end surface to which the diffusion element is connected, the second end surface being provided to be closer to the light guiding element than the first end surface.

(6) The wearable display according to (4) or (5), wherein
  the holder further includes a leg extending from the second end to hold the optical modulation element, wherein
  the virtual-image optical assembly is connected to the leg.

(7) The wearable display according to any one of (1) to (6), further including
  a sheet metal configured to connect the holder and the virtual-image optical assembly to each other.

(8) The wearable display according to (7), wherein
  the sheet metal includes
  a main body, and
  a plurality of projecting pieces provided projecting from the main body to the holder.

(9) The wearable display according to (7), further including
  a frame configured to support a light guiding plate of the virtual-image optical assembly, wherein
  the virtual-image optical assembly includes a collimating optical element configured to receive image light incident from the optical modulation element and emit the image light to the light guiding plate, and
  the collimating optical element is connected to the frame via the sheet metal.

(10) The wearable display according to (1), wherein
  the optical modulation element is a light reflective element.

(11) An image display unit, including:
  a lighting element;
  an optical modulation element;
  a light guiding element configured to guide light from the lighting element to the optical modulation element; and
  a holder configured to be connectable to a virtual-image optical assembly configured to generate a virtual image of image light from the optical modulation element, the holder being configured to integrally hold the lighting element, the optical modulation element, and the light guiding element, the virtual-image optical assembly being used for a wearable display.

(12) A holder, including:
  a first end configured to hold a lighting element;
  a second end that is provided at a position different from a position of the first end and configured to hold an optical modulation element;
  a housing portion that is provided between the first end and the second end and configured to house a light guiding element; and
  a connection portion configured to be connectable to a virtual-image optical assembly configured to generate a virtual image of image light from the optical modulation element, the connection portion extending from the second end, the virtual-image optical assembly being used for a wearable display.

It should be understood by those skilled in the art that various modifications, combinations, sub-combinations and alterations may occur depending on design requirements and other factors insofar as they are within the scope of the appended claims or the equivalents thereof.

What is claimed is:

1. A wearable display, comprising:
  a lighting element;
  an optical modulation element comprising a light transmissive element;
  a light guiding element configured to guide light from the lighting element to the optical modulation element;
  a holder configured to integrally hold the lighting element, the optical modulation element, and the light guiding element, wherein the holder comprises a body including a first end configured to hold the lighting element, a second end that is provided to be opposed to the first end and includes a first end surface to which the optical modulation element is connected so as to hold the optical modulation element, and a middle portion that is provided between the first end and the second end and configured to hold the light guiding element;

a virtual-image optical assembly that is connected to the holder and configured to generate a virtual image of image light from the optical modulation element; and a diffusion element that is disposed on an emitting end surface of the light guiding element, wherein the second end includes a second end surface to which the diffusion element is connected, the second end surface being provided to be closer to the light guiding element than the first end surface.

2. The wearable display according to claim 1, further comprising a sheet metal configured to connect the holder and the virtual-image optical assembly to each other.

3. The wearable display according to claim 2, wherein the sheet metal includes a main body, and a plurality of projecting pieces provided projecting from the main body to the holder.

4. The wearable display according to claim 2, further comprising a frame configured to support a light guiding plate of the virtual-image optical assembly, wherein the virtual-image optical assembly includes a collimating optical element configured to receive image light incident from the optical modulation element and emit the image light to the light guiding plate, and the collimating optical element is connected to the frame via the sheet metal.

5. A wearable display, comprising:

a lighting element;

an optical modulation element comprising a light transmissive element;

a light guiding element configured to guide light from the lighting element to the optical modulation element;

a holder configured to integrally hold the lighting element, the optical modulation element, and the light guiding element, wherein the holder comprises a body including a first end configured to hold the lighting element, a second end that is provided to be opposed to the first end and includes a first end surface to which the optical modulation element is connected so as to hold the optical modulation element, and a middle portion that is provided between the first end and the second end and configured to hold the light guiding element; and a virtual-image optical assembly that is connected to the holder and configured to generate a virtual image of image light from the optical modulation element;

wherein the holder further includes a leg extending from the second end to hold the optical modulation element, and wherein the virtual-image optical assembly is connected to the leg.

6. The wearable display according to claim 5, further comprising a sheet metal configured to connect the holder and the virtual-image optical assembly to each other.

7. The wearable display according to claim 6, wherein the sheet metal includes a main body, and a plurality of projecting pieces provided projecting from the main body to the holder.

8. The wearable display according to claim 6, further comprising a frame configured to support a light guiding plate of the virtual-image optical assembly, wherein the virtual-image optical assembly includes a collimating optical element configured to receive image light incident from the optical modulation element and emit the image light to the light guiding plate, and the collimating optical element is connected to the frame via the sheet metal.

9. A wearable display, comprising:

a lighting element;

an optical modulation element;

a light guiding element configured to guide light from the lighting element to the optical modulation element;

a holder configured to integrally hold the lighting element, the optical modulation element, and the light guiding element;

a virtual-image optical assembly that is connected to the holder and configured to generate a virtual image of image light from the optical modulation element; and a sheet metal configured to connect the holder and the virtual-image optical assembly to each other, wherein the sheet metal includes a main body, and a plurality of projecting pieces provided projecting from the main body to the holder.

10. The wearable display according to claim 9, wherein the optical modulation element comprises a light reflective element.

11. A wearable display, comprising:

a lighting element;

an optical modulation element;

a light guiding element configured to guide light from the lighting element to the optical modulation element;

a holder configured to integrally hold the lighting element, the optical modulation element, and the light guiding element;

a virtual-image optical assembly that is connected to the holder and configured to generate a virtual image of image light from the optical modulation element;

a sheet metal configured to connect the holder and the virtual-image optical assembly to each other; and a frame configured to support a light guiding plate of the virtual-image optical assembly, wherein the virtual-image optical assembly includes a collimating optical element configured to receive image light incident from the optical modulation element and emit the image light to the light guiding plate, and the collimating optical element is connected to the frame via the sheet metal.

12. The wearable display according to claim 11, wherein the optical modulation element comprises a light reflective element.

* * * * *